United States Patent
Tanigawa et al.

(10) Patent No.: US 8,971,684 B2
(45) Date of Patent: Mar. 3, 2015

(54) METHOD OF PRODUCING PREFORM FOR COUPLED MULTI-CORE FIBER, METHOD OF PRODUCING COUPLED MULTI-CORE FIBER, AND COUPLED MULTI-CORE FIBER

(75) Inventors: Shoji Tanigawa, Sakura (JP); Katsuhiro Takenaga, Sakura (JP)

(73) Assignee: Fujikura Ltd., Tokyo (JP)

( * ) Notice: Subject to any disclaimer, the term of this patent is extended or adjusted under 35 U.S.C. 154(b) by 211 days.

(21) Appl. No.: 13/587,189

(22) Filed: Aug. 16, 2012

(65) Prior Publication Data

US 2013/0044989 A1  Feb. 21, 2013

(30) Foreign Application Priority Data

Aug. 17, 2011  (JP) .................................. 2011-178403

(51) Int. Cl.

| | | |
|---|---|---|
| G02B 6/036 | (2006.01) | |
| G02B 6/255 | (2006.01) | |
| C03B 37/012 | (2006.01) | |
| C03B 37/027 | (2006.01) | |
| G02B 6/02 | (2006.01) | |

(52) U.S. Cl.

CPC ..... *C03B 37/01222* (2013.01); *C03B 37/02754* (2013.01); *G02B 6/02042* (2013.01); *C03B 2201/02* (2013.01); *C03B 2201/12* (2013.01); *C03B 2201/20* (2013.01); *C03B 2201/31* (2013.01); *C03B 2203/22* (2013.01); *C03B 2203/26* (2013.01); *C03B 2203/34* (2013.01); *C03B 2205/14* (2013.01)

USPC .................................. 385/126; 65/409; 65/435

(58) Field of Classification Search
CPC ... G02B 6/04; G02B 6/02042; G02B 6/03644
USPC ....................................... 385/126; 65/409, 435
See application file for complete search history.

(56) References Cited

U.S. PATENT DOCUMENTS

| | | | |
|---|---|---|---|
| 2011/0052129 A1* | 3/2011 | Sasaoka | 385/126 |
| 2011/0206330 A1* | 8/2011 | Sasaoka | 385/126 |
| 2012/0144869 A1* | 6/2012 | Tabor et al. | 65/409 |

OTHER PUBLICATIONS

Kokubun, Y. et al. "Novel multi-core fibers for mode division multiplexing: proposal and design principle", IEICE Electronics Express, vol. 6, No. 8, pp. 522-528, Apr. 25, 2009, cited in spec.

* cited by examiner

*Primary Examiner* — Jerry Blevins
(74) *Attorney, Agent, or Firm* — Westerman, Hattori, Daniels & Adrian, LLP

(57) ABSTRACT

Provided is a method of producing a preform 10P for a coupled multi-core fiber including: an arranging process P1 for arranging a plurality of core glass bodies 11R and a clad glass body 12R in such a way that the plurality of core glass bodies 11R are surrounded by the clad glass body 12R; and a collapsing process P2 for collapsing a gap between the core glass bodies 11R and the clad glass body 12R, wherein the respective core glass bodies 11R have outer regions 16 having a predetermined thickness from the periphery surfaces and made of silica glass undoped with germanium, and the clad glass body 12R is made of silica glass having a refractive index lower than a refractive index of the outer regions of the core glass bodies 11R.

5 Claims, 5 Drawing Sheets

REFRACTIVE INDEX

METHOD OF PRODUCING PREFORM FOR COUPLED MULTI-CORE FIBER, METHOD OF PRODUCING COUPLED MULTI-CORE FIBER, AND COUPLED MULTI-CORE FIBER

TECHNICAL FIELD

The present invention relates to a method of producing a preform for a coupled multi-core fiber and a method of producing a coupled multi-core fiber capable of producing a reliable coupled multi-core fiber, and such a coupled multi-core fiber.

BACKGROUND ART

An optical fiber used in an optical fiber communication system that is currently popular has a structure in which the periphery of one core is coated by a clad to allow optical signals to propagate through the core so as to transmit information. In recent years, an amount of information significantly increases along with popularization of optical fiber communication systems. To handle such an increase of the amount of information to be transmitted, a large number of, that is, tens to hundreds of optical fibers are used in an optical fiber communication system so as to perform large amount and long distance optical communications.

To decrease the number of optical fibers in such an optical fiber communication system, it is known to use a multi-core fiber in which the peripheries of a plurality of cores are coated by one clad to allow lights to propagate through the respective cores so as to transmit a plurality of signals.

As such multi-core fibers, a non-coupled multi-core fiber and a coupled multi-core fiber are known. In a non-coupled multi-core fiber, respective cores work as transmission passes independent of each other and the cores are coupled as weakly as possible. In a coupled multi-core fiber, respective cores are coupled to each other so that the plurality of cores can be substantially regarded as one multimode transmission path. This coupled multi-core fiber enables mode multiplexing transmission which transmits different signals for respective modes of lights propagating through the cores.

Non Patent Document 1 listed below discloses an example of such a coupled multi-core fiber. According to Non Patent Document 1, the closer the respective cores of a coupled multi-core fiber are arranged, the stronger the cores are coupled. Therefore, it can be thought that the cores are coupled most strongly when the cores contact with each other.
[Non Patent Document 1] Yasuo Kokubun "Novel multi-core fibers for mode division multiplexing: proposal and design principle" IEICE Electronics Express, Vol. 6, No. 8

SUMMARY OF INVENTION

Stack-and-draw methods can be examples of a method of producing such a coupled multi-core fiber in which respective cores contact with each other. In a stack-and-draw method, in a state where rod-shaped core glass bodies to be respective cores are arranged to be surrounded by a clad glass body to be a clad of an optical fiber, the core glass bodies and the clad glass body may be drawn while collapsing gaps between the respective glass bodies or in the. Alternatively, in the state where the core glass bodies and the clad glass body are arranged as described above, gaps between the core glass bodies and the clad glass body may be collapsed to produce a preform for an optical fiber, and then the preform for an optical fiber may be drawn. Thus, in order to produce a coupled multi-core fiber in which respective cores contact with each other as described above, core glass bodies has to be arranged so as to contact with each other while their periphery surfaces are exposed.

By the way, cores of an optical fiber are usually made of silica glass doped with germanium in order to set the refractive index of the cores higher than that of a clad. This is because silica glass doped with germanium can prevent loss of light propagating therethrough and thus the refractive index can be easily set high.

However, germanium existing on the peripheral surface of a core glass body, that is, on a gas-solid interface volatilizes at a temperature where core glass bodies and a clad glass body are drawn while gaps therebetween are collapsed or at a temperature where gaps are collapsed to produce a preform for an optical fiber due to its characteristic. Therefore, bubbles may be formed around the cores when core glass bodies are arranged so as to contact with each other while their periphery surfaces are exposed as described above and then drawing process or a collapse process are performed to produce an optical fiber.

Such bubbles formed around the cores may increase loss of signals propagating through the cores and may decrease the strength of the optical fiber, and thus the reliability of the optical fiber may be decreased.

Therefore, an object of the invention is to provide a method of producing a preform for a coupled multi-core fiber and a method of producing a coupled multi-core fiber capable of producing a reliable coupled multicore, and such a coupled multi-core fiber.

In order to achieve the objects, the invention provides a method of producing a preform for a coupled multi-core fiber which is provided with a plurality of cores and in which periphery surfaces of adjacent cores among the cores contact with each other, the method including: an arranging process for arranging a plurality of core glass bodies to be the plurality of cores and a clad glass body in such a way that the plurality of core glass bodies are surrounded by the clad glass body, and the periphery surfaces of adjacent core glass bodies among the core glass bodies contact with each other; and a collapsing process for collapsing a gap between the core glass bodies and the clad glass body, wherein the respective core glass bodies have outer regions having a predetermined thickness from the periphery surfaces and made of silica glass undoped with germanium, and the clad glass body is made of silica glass having a refractive index lower than a refractive index of the outer regions of the core glass bodies.

With the method of producing a perform (a base material) for a coupled multi-core fiber described above, the outer regions of the core glass bodies are undoped with germanium, and thus generation of gas due to germanium volatilizing from the core glass bodies can be prevented even when the core glass bodies are heated in the collapsing process. Therefore, generation of bubbles due to volatilized gas of germanium can be prevented between the core glass bodies and the clad glass body of a produced preform for a coupled multi-core fiber. By drawing the preform for a coupled multi-core fiber produced by the producing method described above, a reliable coupled multi-core fiber in which generation of bubbles between cores and a clad is prevented can be produced.

A method of producing a coupled multi-core fiber according to the invention includes a drawing process for drawing the preform for a coupled multi-core fiber produced by the method of producing a preform for a coupled multi-core fiber described above.

With the method of producing a coupled multi-core fiber described above, the preform for a coupled multi-core fiber in which generation of bubbles between the core glass bodies and the clad glass body is prevented is drawn, and thus a reliable coupled multi-core fiber in which generation of bubbles between cores and a clad is prevented can be produced.

The invention also provides a method of producing a coupled multi-core fiber which is provided with a plurality of cores and in which periphery surfaces of adjacent cores among the cores contact with each other, the method including: an arranging process for arranging a plurality of core glass bodies to be the plurality of cores and a clad glass body in such a way that the plurality of core glass bodies are surrounded by the clad glass body, and the periphery surfaces of adjacent core glass bodies among the core glass bodies contact with each other; and a drawing process for drawing the core glass bodies and the clad glass body while collapsing a gap between the core glass bodies and the clad glass body, wherein the respective core glass bodies have outer regions having a predetermined thickness from the periphery surfaces and made of silica glass undoped with germanium, and the clad glass body is made of silica glass having a refractive index lower than a refractive index of the outer regions of the core glass bodies.

With the method of producing a coupled multi-core fiber described above, generation of gas due to germanium volatilizing from the core glass bodies can be prevented even when the core glass bodies are heated while drawn. Therefore, generation of bubbles due to volatilized gas of germanium can be prevented between the cores and the clad of the coupled multi-core fiber, and thus a reliable coupled multi-core fiber can be produced.

The outer regions of the core glass bodies may be made of pure silica glass or silica glass doped with chlorine.

The respective core glass bodies may have inner regions surrounded by the outer regions and made of silica glass doped with germanium.

The respective core glass bodies may be made of only silica glass undoped with germanium.

When the respective core glass bodies are made of only silica glass undoped with germanium as described above, the respective core glass bodies may be made of only pure silica glass or only silica glass doped with chlorine.

A coupled multi-core fiber according to the invention is provided with a plurality of cores and in which periphery surfaces of adjacent cores among the cores contact each other, wherein the respective cores have outer regions having a predetermined thickness from the periphery surfaces and made of silica glass undoped with germanium, and a clad surrounding the cores is made of silica glass having a refractive index lower than a refractive index of the outer regions of the cores.

With a coupled multi-core fiber having such a configuration, generation of gas due to volatilized germanium between the cores and the clad can be prevented at a step of producing the coupled multi-core fiber, and thus generation of bubbles can be prevented between the cores and the clad. Therefore, reduction in yield because of elimination of bubbles can be prevented. Thus, such a coupled multi-core fiber can be reliable and low-cost.

The outer regions may be made of pure silica glass or silica glass doped with chlorine.

The respective cores may have inner regions surrounded by the outer regions and made of silica glass doped with germanium.

The respective cores may be made of only silica glass undoped with germanium. In this case, the respective cores may be made of only pure silica glass or only silica glass doped with chlorine.

As described above, a method of producing a preform for a coupled multi-core fiber and a method of producing a coupled multi-core fiber capable of producing a reliable coupled multi-core fiber, and such a coupled multi-core fiber can be provided according to the present invention.

EMBODIMENT OF THE INVENTION

Figure 1A:
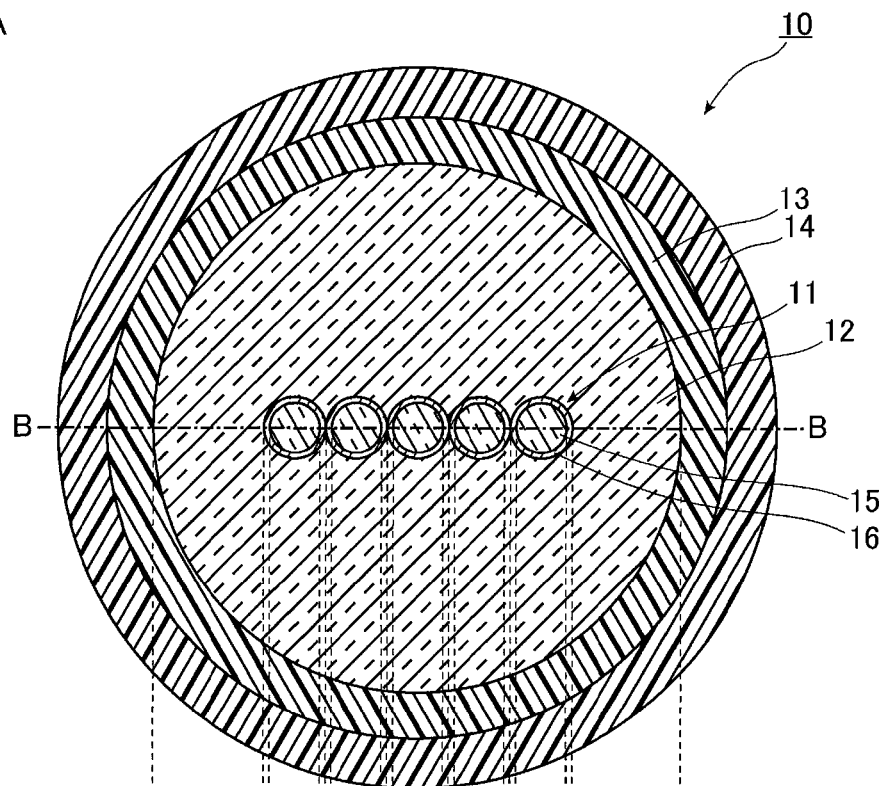
FIGS. 1A and 1B are views showing an aspect of a coupled multi-core fiber according to a first embodiment of the invention.

Suitable embodiments of a method of producing a preform for a coupled multi-core fiber, a method of producing a coupled multi-core fiber, and a coupled multi-core fiber according to the invention will be described hereinafter referring to the drawings. For convenience of understanding, scales of the respective drawings and scales in the following description may differ from each other.

(First Embodiment)

Figure 1B:
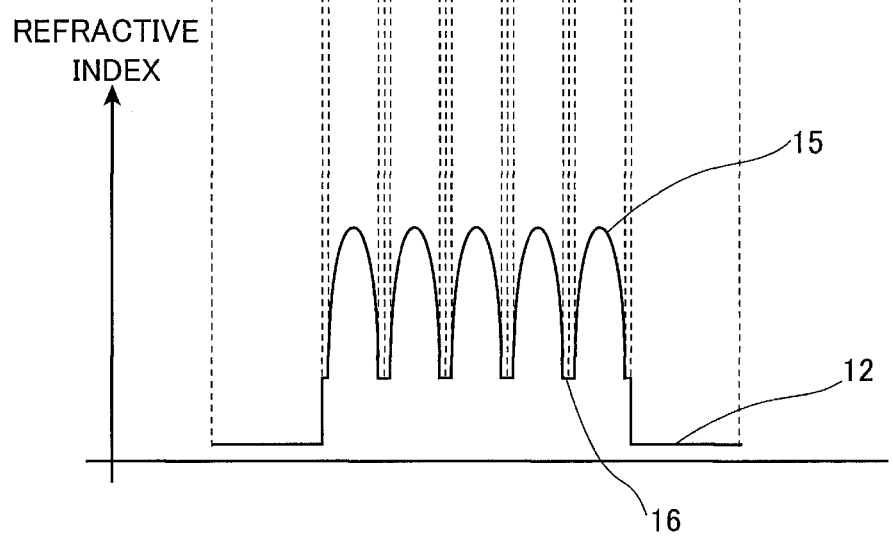

FIGS. 1A and 1B are views showing an aspect of a coupled multi-core fiber (referred to as a multi-core fiber, hereinafter) according to a first embodiment of the invention. Specifically, FIG. 1A is a sectional view perpendicular to the longitudinal direction of the coupled multi-core fiber according to the first embodiment, and FIG. 1B is a view showing the refractive index distribution along the line B-B of FIG. 1A.

As shown in FIG. 1A, a multi-core fiber 10 of this embodiment includes: a plurality of cores 11; a clad 12 surrounding the periphery surfaces of the plurality of cores 11 without gaps therebetween; an inner protective layer 13 coating the periphery surface of the clad 12; and an outer protective layer 14 coating the periphery surface of the inner protective layer 13.

In this embodiment, the respective cores 11 are arranged linearly along a radial direction of the clad 12 while the periphery surfaces of adjacent cores 11 contact with each other. The respective cores 11 are made to have substantially the same diameter as each other.

As shown in FIG. 1A, in the multi-core fiber 10, each of the cores 11 has a two-layered structure and the respective cores 11 have outer regions 16 having a predetermined thickness from the periphery surfaces of the cores 11 and inner regions 15 surrounded by the outer regions 16. As shown in FIG. 1B, the respective cores 11 have similar refractive index distributions to each other, and the refractive index of each of the outer regions 16 is set to be constant and higher than the refractive index of the clad 12. The refractive index of each of the inner regions 15 is set to be higher than the refractive index of the outer region 16, and the inner region 15 is made to have the highest refractive index at the center side thereof and to have substantially the same refractive index as the outer region 16 at the periphery side of the inner region 15. With such configuration, the respective cores 11 are made to have a higher refractive index as a whole than the clad 12.

The profile of the refractive index distribution of the inner regions 15 can be α power distribution, for example, but is not particularly limited thereto. The α power distribution referred herein is a distribution having a refractive index n (r) expressed by Equation (1) below.

$$n(r) = n_1[1 - 2\Delta(r/a)^\alpha]^{1/2} \quad (1)$$

In the equation, "r" represents a distance from the center of the inner region 15, "$n_1$" represents a refractive index of the inner region 15 at the center thereof, "Δ" represents a relative refractive index difference from the outer region 16, and "a" represents an outermost diameter of the α power distribution. When the refractive index distribution of the inner region 15 is set to be the α power distribution in whole as set in this embodiment, "a" is the same as the diameter of the inner region 15. The value of "α" can be set to about 1.2 to 10, for example, but is not particularly limited thereto and preferably set to 1.5 to 5 from the viewpoint of preventing breakage of glass during production. Incidentally, when the inner region 15 is made to have the α power distribution, the α power distribution may deviate from an ideal α power distribution due to unevenly distributed dopants or the like, however an effective α power distribution as a whole is acceptable.

In the center of the inner region 15, the relative refractive index difference from the clad 12 is preferably set to 0.85% to 3.5% and more preferably set to 1.0% to 1.9% for a core having the refractive index distribution of the α power distribution because such a multi-core fiber is more suitable for practical use from the viewpoint of connection characteristics and mode propagation characteristics. In addition, the relative refractive index difference of the outer region 16 from the clad 12 is preferably set to 0.3% to 1.0%.

The inner region 15 having such a refractive index distribution may be made of silica glass doped with germanium, and the concentration of germanium is distributed in such a manner that the refractive index distribution shown in FIG. 1B is provided. The outer region 16 is made of silica glass undoped with germanium. For example, the outer region 16 may be made of pure silica glass without any dopant, or may be made of silica glass slightly doped with chlorine in order to eliminate OH group from silica at the step of producing the core 11. Such slightly doped chlorine varies the refractive index of silica glass little. When the outer region 16 is made of pure silica glass or silica glass slightly doped with chlorine, the clad 12 is made of silica glass doped with a dopant that decreases the refractive index. Such a dopant that decreases refractive index may be fluorine, for example.

In addition, the diameter of each of the cores 11 of the multi-core fiber 10 can be 5 μm, for example, but is not particularly limited thereto. The thickness of the outer region 16 may be set to 0.1 μm or more and more preferably set to 0.2 μm or more. Further, the ratio of the diameter of the inner region 15 to the outer diameter of the outer region 16 is preferably set to 0.5 to 0.97 and more preferably set to 0.8 to 0.95 because such a value is practical but is not particularly limited thereto. Therefore, when the diameter of the core 11 is set to 5 μm as described above, the diameter of the inner region 15 can be set to 4 μm to 4.8 μm, for example, but is not particularly limited thereto. Thus, the upper limit of the thickness of the outer region 16 should be a thickness ensuring the inner region as described above. Also, the diameter of the clad 12 can be 125 μm, for example, but is not limited thereto.

In addition, the materials of the inner protective layer 13 and the outer protective layer 14 may be ultraviolet curable resin of different types.

In the multi-core fiber 10 described above, the outer region 16 of each of the cores 11 has a refractive index between the refractive index of the inner region 15 and the refractive index of the clad 12. Therefore, when a light propagates through the core, a low-intensity light can spread farther from the center of the core comparing to a core without the outer region 16. In other word, the profile of the intensity distribution of a light in the core 11 along a diameter direction has a wider base. Therefore, the electromagnetical field distributions of lights propagating through the respective cores 11 adjacent to each other can have more overlapping parts, and thus the adjacent cores 11 can be strongly coupled. In other word, even when the center-to-center distances of the cores 11 are large similarly to a plurality of cores arranged separately from each other having the same center-to-center distances as the respective cores 11 of the multi-core fiber 10 but having no outer regions, a difference of the propagation constants between modes can be larger, and thus the adjacent cores 11 can be strongly coupled to each other. As described above, the cores adjacent to each other are strongly coupled and the respective cores correlate to each other so that the cores can be regarded as a multimode transmission path as a whole. Therefore, the multi-core fiber 10 described above is capable of mode multiplexing transmission, in which signals are superimposed to respective modes of lights propagating through the cores 11. Communications using such mode multiplexing transmission can be Multi-Input Multi-Output (MIMO) communications, for example. Here, since the multi-core fiber 10 described above has a big propagation constant difference between respective modes as described above, the multi-core fiber 10 is capable of mode multiplexing/demultiplexing at input/output sections of the respective modes more easily comparing to a Graded-Index (GI) multimode fiber and a Step-Index (SI) multimode fiber which are common, and thus is more suitable for mode multiplexing transmission. In addition, with the multi-core fiber 10, individual lights propagating through the respective cores adjacent to each other can be extracted more easily comparing to the case where the periphery surfaces of the cores without outer regions contact with each other. When mode multiplexing transmission is performed as described above, it is easier to extract individual lights propagating through the respective cores and thus easier to perform mode separation comparing to the case where the periphery surfaces of the cores without the outer regions 16 contact with each other.

Next, a method of producing the multi-core fiber 10 will be described.

(First Producing Method)

A first method of producing the multi-core fiber 10 will be described first. In the first producing method, a preform for a coupled multi-core fiber (referred to as a preform hereinafter) is produced, and then the produced preform is drawn to produce a multi-core fiber.

Figure 2:
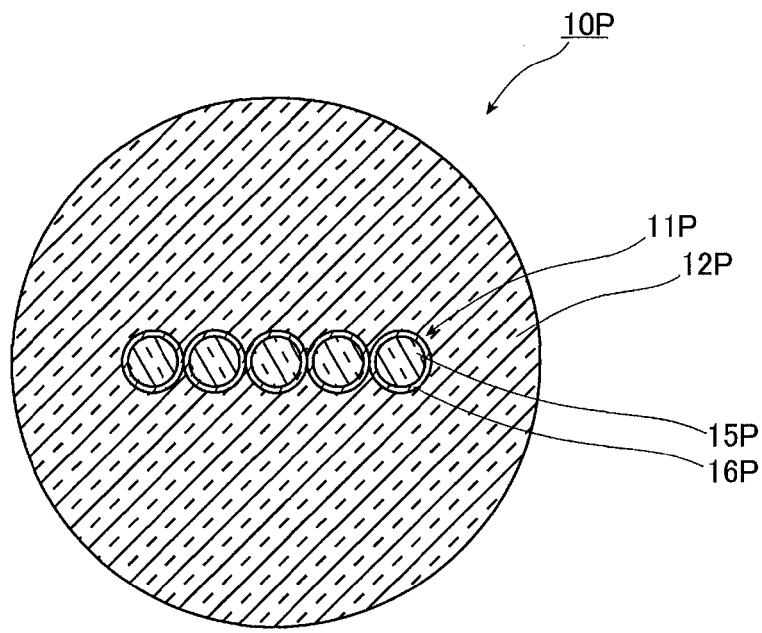
FIG. 2 is a sectional view perpendicular to the longitudinal direction of a preform for a coupled multi-core fiber to produce the coupled multi-core fiber shown in FIGS. 1A and 1B.

FIG. 2 is a view showing an aspect of a cross-section perpendicular to the longitudinal direction of a preform to produce the multi-core fiber shown in FIGS. 1A and 1B. As shown in FIG. 2, a preform 10P has a substantially cylindrical shape and includes: a plurality of rod-shaped core glass bodies 11P to be the respective cores 11; and a clad glass body 12P that is to be the clad 12 and surrounds the core glass bodies 11P. Each of the core glass bodies 11P includes an inner region 15P and an outer region 16P surrounding the inner region 15P. The cross-section structure of this preform 10P is made to be substantially homologous with the cross-section structure of the multi-core fiber 10 excepting for the inner protective layer 13 and the outer protective layer 14. The preform 10P described above is drawn and coated as described later to be the multi-core fiber 10 shown in FIGS. 1A and 1B.

Figure 3:
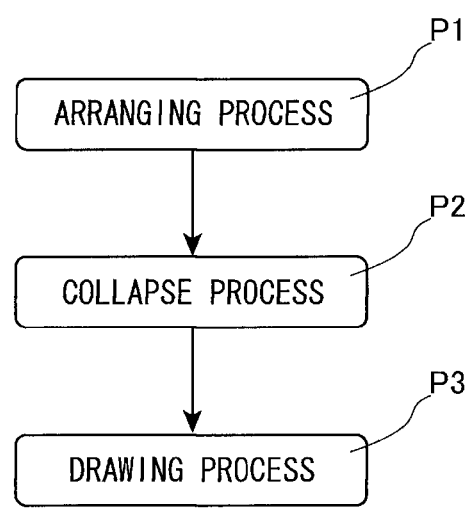
FIG. 3 is a flowchart showing processes of a first method of producing the coupled multi-core fiber shown in FIGS. 1A and 1B.

FIG. 3 is a flowchart showing processes for producing the preform 10P shown in FIG. 2 and the first producing method of the multi-core fiber shown in FIGS. 1A and 1B. As shown in FIG. 3, the processes in the method of producing the preform 10P include: an arranging process P1 for arranging core glass bodies and a clad glass body; and a collapse process P2 for collapsing gaps between the core glass bodies and the clad glass body. And the method of producing the multi-core fiber 10 further includes a drawing process P3 for drawing the preform 10P produced as described above.

<Arranging Process P1>

Figure 4:
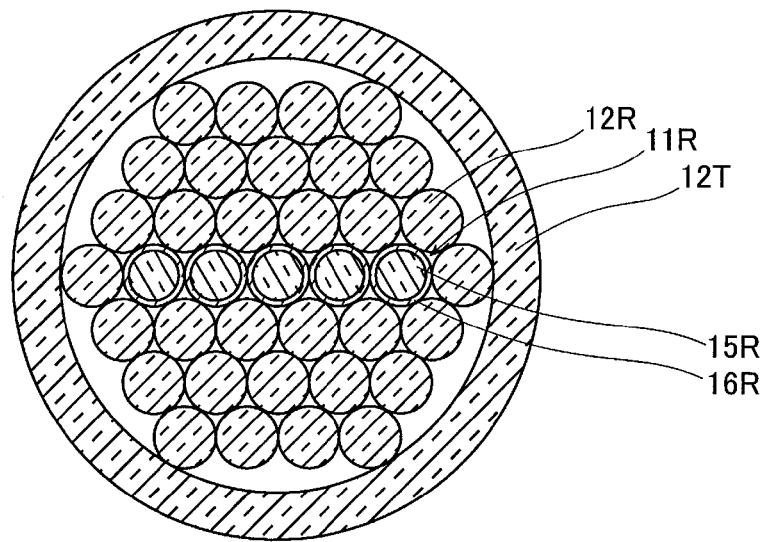
FIG. 4 is a view showing a state where core glass bodies and a clad glass body are arranged.

FIG. 4 is a view showing a state where core glass bodies and clad glass bodies are arranged. In the arranging process P1, firstly, a plurality of core glass bodies 11R shown in FIG. 4 are prepared. The core glass bodies 11R are glass bodies to be the core glass bodies 11P shown in FIG. 2, and glass bodies finally to be the respective cores 11 of the multi-core fiber 10 shown in FIGS. 1A and 1B. Therefore, the number of core glass bodies 11R to be prepared is the same as the number of cores 11. In addition, each of the core glass bodies 11R is rod-shaped having substantially the same shape and size as each of the core glass bodies 11P shown in FIG. 2. Further, each of the core glass bodies 11R includes: an inner region 15R made of a material similar to the material of the inner region 15 of each of the cores 11; and an outer region 16R that surrounds the inner region 15R, is made of a material similar to the material of the outer region 16 of the core 11, and has a predetermined thickness. Therefore, in this embodiment, the inner region 15R is doped with germanium in such a way that the refractive index thereof is α power distribution. The predetermined thickness of this outer region 16R is preferably set to 0.1 mm or more and more preferably set to 0.2 mm or more, but is not particularly limited thereto as long as the inner region 15R can be ensured and germanium doped into the inner region 15R is prevented from volatilizing while heated as described later.

In addition to the preparation of the core glass bodies 11R, clad glass bodies are prepared. Clad glass bodies to be prepared include a plurality of rod-shaped clad glass bodies 12R and one tubular clad glass body 12T. These clad glass bodies 12R and 12T are glass bodies to be the clad glass body 12P shown in FIG. 2, and glass bodies finally to be the clad 12 of the multi-core fiber 10 shown in FIGS. 1A and 1B. Therefore, the material for the clad glass bodies 12R and 12T is chosen to be similar to the material for the clad 12 described above.

Next, the plurality of core glass bodies 11R and the plurality of clad glass bodies 12R are arranged inside the through hole of the tubular clad glass body 12T. Specifically, the respective core glass bodies 11R are arranged in such a way that the plurality of core glass bodies 11R are in one horizontal line while the periphery surfaces of adjacent core glass bodies 11R contact with each other, and the respective clad glass bodies 12R are arranged in such a way that the core glass bodies 11R in the horizontal line are surrounded by the plurality of clad glass bodies 12R. Here, it is preferable that the clad glass bodies 12R having different diameters be prepared and arranged from the viewpoint of decreasing gaps inside the through hole of the clad glass body 12T although this is not particularly shown.

Thus, a state where the core glass bodies 11R and the clad glass bodies 12R and 12T are arranged as shown in FIG. 4 is provided.

<Collapse Process P2>

Next, the arranged core glass bodies 11R and the clad glass bodies 12R and 12T are heated for collapse. In other word, spaces in the through hole of the clad glass body 12T such as spaces between the core glass bodies 11R and the clad glass bodies 12R are collapsed so that the core glass bodies 11R and the clad glass bodies 12R and 12T are integrated. Thus, the core glass bodies 11R become the core glass bodies 11P shown in FIG. 2 with little deformation and the clad glass bodies 12R and 12T become the clad glass body 12P shown in FIG. 2.

Here, when germanium is distributed on the surfaces of the glass bodies, the germanium volatilizes due to its characteristic. However, since the material of the outer regions 16R of the predetermined thickness in the core glass bodies 11R is chosen to be similar to the material of the outer region 16 as described above and thus undoped with germanium. Therefore, generation of gas due to germanium volatilizing from the core glass bodies 11R is prevented in this process where the core glass bodies 11R are heated. In addition, since the refractive index of the inner region 15P is made to be α power distribution in this embodiment, germanium is doped on the periphery side of the inner region 15P at a low concentration. Therefore, even when the predetermined thickness of the outer region 16 is small, generation of gas due to germanium volatilization is prevented.

Thus, the preform 10P shown in FIG. 2 is provided.

<Drawing Process P3>

Figure 5:
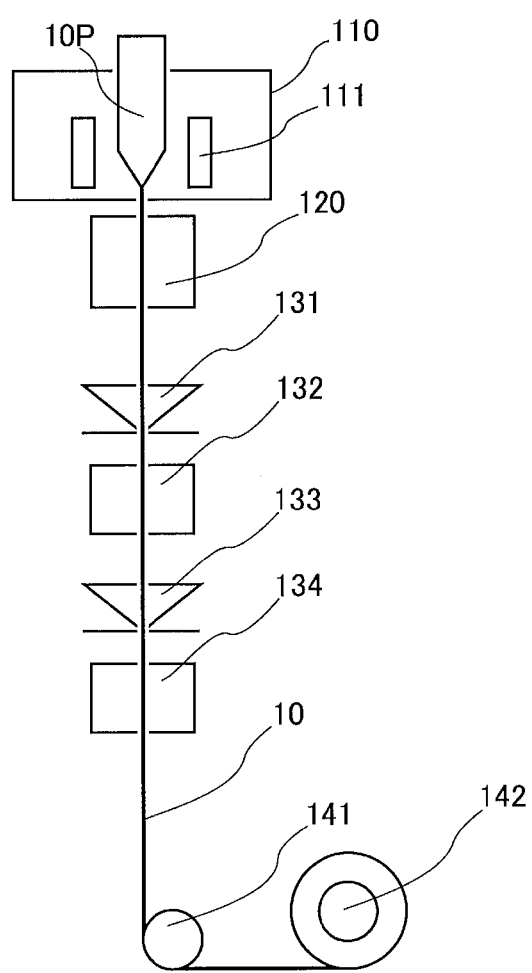
FIG. 5 is a view showing an aspect of a drawing process.

FIG. 5 is a view showing an aspect of the drawing process P3.

As a preparation step for the drawing process P3, the preform 10P produced through the arranging process P1 and the collapse process P2 is set in a spinning furnace 110. Then the preform 10P is heated by making a heating section 111 of the spinning furnace 110 to generate heat. At this time, the bottom of the preform 10P is heated to 2000° C., for example, so as to be melted. Then, glass is melted from the preform 10P and the glass is drawn. The thus drawn glass which is melted is solidified right after the glass is drawn out of the spinning furnace 110 so that the core glass bodies 11P become the cores 11 and the clad glass body 12P becomes the clad 12, whereby a multi-core fiber including the plurality of cores 11 and the clad 12 is formed. Thereafter, the multi-core fiber passes through a cooling device 120 so as to be cooled to an appropriate temperature. The temperature of the multi-core fiber when it goes into the cooling device 120 is about 1800° C., for example, but the temperature of the multi-core fiber when it comes out from the cooling device 120 is 40° C. to 50° C., for example.

The multi-core fiber that has come out of the cooling device 120 passes through a coating device 131 having ultraviolet light curable resin to be the inner protective layer 13 therein so that the multi-core fiber is coated with this ultraviolet light curable resin. Then, the multi-core fiber passes through an ultraviolet light irradiating device 132 to be irradiated with an ultraviolet light, whereby the ultraviolet light curable resin is cured to form the inner protective layer 13. Next, the multi-core fiber passes through a coating device 133 having ultraviolet light curable resin to be the outer protective layer 14 therein so that the multi-core fiber is coated with the ultraviolet light curable resin. Then the multi-core fiber passes through an ultraviolet light irradiating device 134 to be irradiated with an ultraviolet light, whereby the ultraviolet light curable resin is cured to form the outer protective layer 14, and thus the multi-core fiber 10 shown in FIGS. 1A and 1B is provided.

Then, a moving direction of the multi-core fiber 10 is changed by a turn pulley 141 and reeled by a reel 142.

Thus, the multi-core fiber 10 shown in FIGS. 1A and 1B is produced.

As described above, with the method of producing the preform 10P included in the first producing method of this embodiment, the outer regions 16R of the core glass bodies 11R are undoped with germanium, and thus generation of gas due to germanium volatilizing from the core glass bodies 11R can be prevented even when the core glass bodies 11R are heated in the collapse process P2. Therefore, generation of bubbles due to volatilized gas of germanium can be prevented between the core glass bodies 11P and the clad glass body 12P of the produced preform 10P.

Then, with the method of producing the multi-core fiber 10 using this preform 10P, the preform 10P in which generation of bubbles is prevented between the core glass bodies 11P and the clad glass body 12P is drawn. Therefore, the reliable multi-core fiber 10 in which generation of bubbles is prevented between the cores 11 and the clad 12 can be produced.

(Second Producing Method)

Next, a second method of producing the multi-core fiber 10 will be described. The second producing method is different from the first producing method in a point that the multi-core fiber 10 is produced without producing the preform 10P.

In the second producing method, an arranging process is performed similarly to the first producing method. That is, core glass bodies 11R and clad glass bodies 12R and 12T similar to those of the first producing method are prepared and the core glass bodies 11R and the clad glass bodies 12R and 12T are arranged similarly to the first producing method. Thus, a state where the core glass bodies 11R and the clad glass bodies 12R and 12T are arranged as shown in FIG. 4 is provided.

Then in the second producing method, the arranged core glass bodies 11R and clad glass bodies 12R and 12T are set in a spinning furnace while keeping their positions with respect to each other. In other word, the core glass bodies 11R and the clad glass bodies 12R and 12T arranged as shown in FIG. 4 are set in the spinning furnace 110 instead of the preform 10P shown in FIG. 5.

Then the core glass bodies 11R and the clad glass bodies 12R and 12T are heated by making the heating section 111 of the spinning furnace 110 to generate heat. With this heat, the core glass bodies 11R and the clad glass bodies 12R and 12T are drawn while collapsing spaces in the through hole of the clad glass body 12T such as gaps between the core glass bodies 11R and the clad glass bodies 12R. At this time, similarly to the first producing method, the outer regions 16R of the predetermined thickness in the core glass bodies 11R are undoped with germanium, and thus generation of gas due to germanium volatilizing from the core glass bodies 11R is prevented when the core glass bodies 11R are heated and melted.

The thus drawn glass which is melted becomes the multi-core fiber 10 similarly to the first producing method and then reeled by the reel 142. Thus, the multi-core fiber 10 shown in FIGS. 1A and 1B is produced.

As described above, with the second method of producing the multi-core fiber 10 of this embodiment, generation of gas due to germanium volatilizing from the core glass bodies 11R can be prevented even when the core glass bodies 11R are heated while drawn. Therefore, generation of bubbles due to volatilized gas of germanium can be prevented between the cores 11 and the clad 12, and thus the reliable multi-core fiber 10 can be produced.

(Second Embodiment)

Next, a second embodiment of the present invention will be described in detail referring to FIGS. 6A to 8. Here, components that are identical or similar to those in the first embodiment are indicated by the same reference numerals and the same explanation will not be repeated unless otherwise particularly described.

Figure 6A:
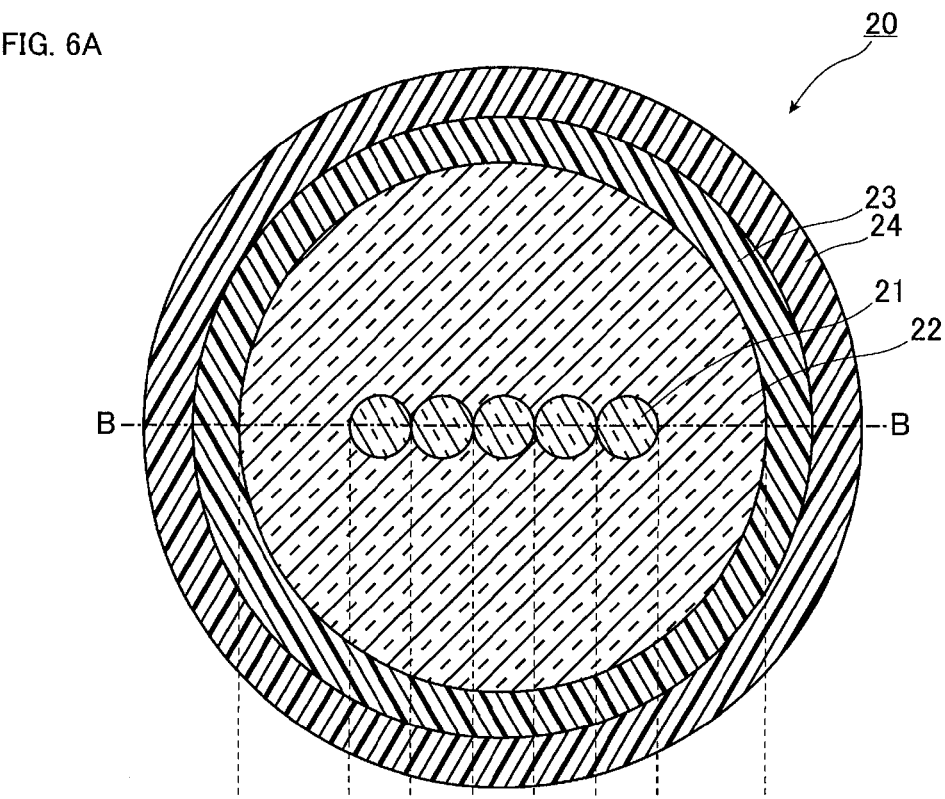
FIGS. 6A and 6B are views showing an aspect of a coupled multi-core fiber according to a second embodiment of the invention.
Figure 6B:
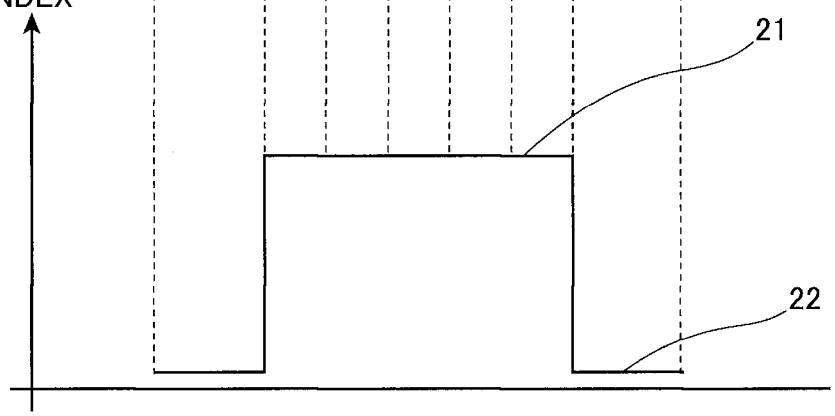

FIGS. 6A and 6B are views showing an aspect of a coupled multi-core fiber (referred to as a multi-core fiber, hereinafter) according to the second embodiment of the invention. Specifically, FIG. 6A a sectional view perpendicular to the longitudinal direction of the multi-core fiber according to this embodiment, and FIG. 6B is a view showing the refractive index distribution along the line B-B.

As shown in FIG. 6A, a multi-core fiber 20 of this embodiment includes: a plurality of cores 21; a clad 22 of the shape and the material similar to those of the clad 12 of the multi-core fiber according to the first embodiment; an inner protective layer 23 and an outer protective layer 24 of the shape and the material similar to those of the inner protective layer 13 and the outer protective layer 14 of the first embodiment respectively.

The respective cores 21 are arranged linearly along a radial direction of the clad 22 while the periphery surfaces of adjacent cores 21 contact with each other similarly to the plurality of cores 11 of the first embodiment. The diameters of the respective cores 21 are set to be substantially the same as each other.

Each of the cores 21 is different from each of the cores 11 of the first embodiment in a point that the refractive index thereof is uniform as a whole and the core 21 doesn't have the two-layered structure. As shown in FIG. 6B, the refractive indexes of the cores 21 of this embodiment are set to be higher than the refractive index of the clad 22. The cores 21 are made of a material similar to the material of the outer regions 16 of the cores 11 of the first embodiment. Which means each of the cores 21 of this embodiment includes an outer region and whole of the core 21 is made of a material undoped with germanium though the core 21 does not particularly have a boundary between the outer region and an inner region. In other word, each of the cores 21 of this embodiment can be regarded as having an outer region and an inner region made of the same material and thus having the same refractive index though the core 21 does not particularly have a boundary between the outer region and the inner region.

In the multi-core fiber 20 as described above, the cores 21 contact with each other, and thus the adjacent cores 21 are strongly coupled and the respective cores 21 correlate to each other so that the cores 21 can be regarded as a multimode transmission path as a whole. Therefore, the multi-core fiber 20 described above is capable of mode multiplexing transmission, in which signals are superimposed to respective modes of lights propagating through the cores 21 similarly to the multi-core fiber 10 of the first embodiment. However, mode separation in mode multiplexing transmission can be easier when outer regions of cores have refractive indexes between refractive indexes of inner regions and a refractive index of a clad like the first embodiment.

Next, a method of producing the multi-core fiber 20 will be described.

(First Producing Method)

Also in this embodiment, in a first producing method, a preform for a coupled multi-core fiber (referred to as a preform hereinafter) is produced, and then the produced preform is drawn to produce a multi-core fiber. Therefore, the first producing method of this embodiment has processes similar to those shown in FIG. 3.

<Arranging Process P1>

Figure 7:
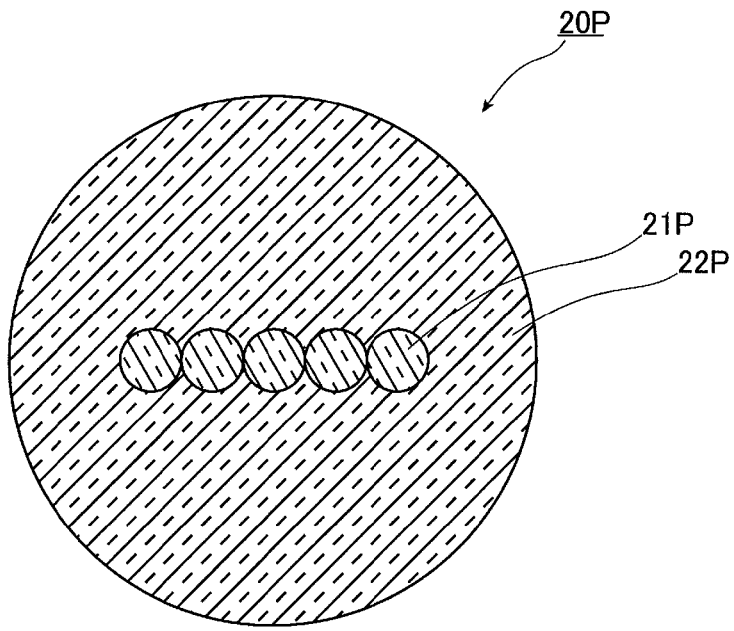
FIG. 7 is a sectional view perpendicular to the longitudinal direction of a preform for a coupled multi-core fiber to produce the coupled multi-core fiber shown in FIGS. 6A and 6B.

FIG. 7 is a view showing an aspect of a cross-section perpendicular to the longitudinal direction of a preform to produce the multi-core fiber shown in FIG. 6A. As shown in FIG. 7, a preform 20P includes: a plurality of rod-shaped core glass bodies 21P to be the respective cores 21; and a clad glass body 22P to be the clad 22 surrounding the core glass bodies 21P. Each of the clad glass bodies 22P is configured similarly to each of the clad glass bodies 12P in the preform 10P of the first embodiment. The cross-section structure of the preform 20P is made to be substantially homologous with the cross-section structure of the multi-core fiber 20 excepting for the inner protective layer 23 and the outer protective layer 24.

Figure 8:
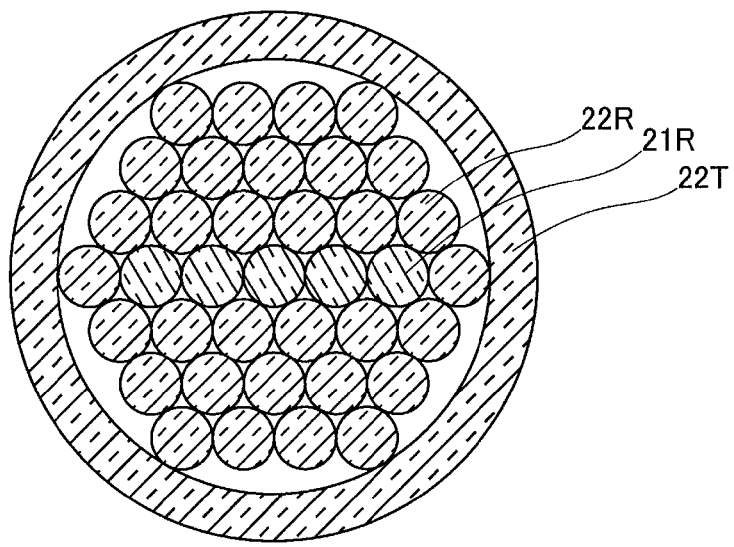
FIG. 8 is a view showing a state where core glass bodies and clad glass bodies are arranged.

Also in this embodiment, an arranging process is firstly performed similarly to the arranging process P1 in the first producing method according to the first embodiment. FIG. 8 is a view showing a state where core glass bodies and clad glass bodies are arranged. In this embodiment, the same number of core glass bodies 21R with the number of the cores 21 made of a material similar to the material of the cores 21 are prepared. Which means core glass bodies 21R, each of which has an outer region having a predetermined thickness and is made of a material undoped with germanium as a whole though which has no particular boundary between the outer region and an inner region, are prepared. Also, clad glass bodies 22R, 22T similarly to the clad glass bodies 12R and 12T prepared in the first producing method according to the first embodiment are prepared.

Then, similarly to the first producing method, the respective core glass bodies 21R are arranged in such away that the plurality of core glass bodies 21R are in one horizontal line in the through hole of the clad glass body 22T while the periphery surfaces of adjacent core glass bodies 21R contact with each other, and the respective clad glass bodies 22R are arranged in such a way that the core glass bodies 21R in the horizontal line are surrounded by the plurality of clad glass bodies 22R.

Thus, the core glass bodies 21R and the clad glass bodies 22R and 22T are arranged as shown in FIG. 8.

<Collapse Process P2>

Next, a collapse process P2 is performed similarly to the first producing method according to the first embodiment. With this collapse process P2, spaces in the through hole of the clad glass body 22T such as spaces between the core glass bodies 21R and the clad glass bodies 22R are collapsed so that the core glass bodies 21R and the clad glass bodies 22R and 22T are integrated. Thus, the core glass bodies 21R become the core glass body 21P and the clad glass bodies 22R and 22T become the clad glass body 22P, whereby the preform shown in FIG. 7 is provided.

Here, each of the core glass bodies 21R includes an outer region and whole of the core glass body 21R is made of a material undoped with germanium. In other word, each of the core glass bodies 21R has an outer region and inner region made of the same material undoped with germanium though the core glass body 21R does not particularly have a boundary between the outer region and the inner region. Therefore, generation of gas due to germanium volatilizing from the core glass bodies 21R is prevented in this process where the core glass bodies 21R are heated.

<Drawing Process P3>

Next, a drawing process is performed similarly to the first producing method according to the first embodiment.

Thus, the multi-core fiber 20 shown in FIGS. 6A and 6B are produced.

As described above, with the method of producing the preform 20P included in the first producing method of this embodiment, each of the core glass bodies 21R includes an outer region and whole of the core glass body 21R is undoped with germanium though the core glass body 21R does not particularly have a boundary between the outer region and an inner region. Therefore, generation of bubbles due to volatilized gas of germanium can be prevented between the core glass bodies 21P and the clad glass body 22P of the produced preform 20P.

Thus, by drawing the preform 20P, the reliable multi-core fiber 20 in which generation of bubbles is prevented between the cores 21 and the clad 22 can be produced.

(Second Producing Method)

Next, a second method of producing the multi-core fiber 20 will be described. In the second producing method of this embodiment, the multi-core fiber 20 is produced without producing the preform 20P similarly to the second producing method of the first embodiment.

In the second producing method of this embodiment, an arranging process is performed similarly to the first producing method of this embodiment. That is, core glass bodies 21R and clad glass bodies 22R and 22T similar to those of the first producing method of this embodiment are prepared and the core glass bodies 21R and the clad glass bodies 22R and 22T are arranged similarly to the first producing method. Thus, a state where the core glass bodies 21R and the clad glass bodies 22R and 22T are arranged as shown in FIG. 8 is provided.

Next, similarly to the second producing method of the first embodiment, the arranged core glass bodies 21R and clad glass bodies 22R and 22T are set in a spinning furnace 110 to perform a drawing process so that the multi-core fiber 20 shown in FIGS. 6A and 6B is produced.

At this time, similarly to the first producing method of this embodiment, each of the core glass bodies 21R includes an outer region and whole of the core glass body 21R is undoped with germanium. Therefore, generation of gas due to germanium volatilizing from the core glass bodies 21R is prevented when the core glass bodies 21R are heated and melted.

Therefore, with the method of producing the multi-core fiber 20 according to the second producing method of this embodiment, generation of bubbles due to volatilized gas of germanium can be prevented between the cores 21 and the clad 22, and thus the reliable multi-core fiber 20 can be produced.

Although the invention has been described above by reference to the first and second embodiments as examples, the invention is not limited thereto.

For example, the material of the outer region 16 of each of the cores 11 according to the first embodiment and the material of the core 21 according to the second embodiment can be silica glass doped with any dopant as long as the silica glass is undoped with germanium. For example, aluminum or phosphorus may be doped as dopant. In this case, an amount of germanium in the inner region 15 of the first embodiment may be adjusted so as to present the refractive index distribution shown in FIG. 1B. In addition, when the outer region 16 of each of the cores 11 according to the first embodiment or each of the cores 21 according to the second embodiment is doped with aluminum or phosphorus, the clads 12 and 22 can be made of pure silica glass or silica glass slightly doped with chlorine as long as the refractive index of the clad 12 is lower than that of the outer region 16 and the refractive index of the clad 22 is lower than that of the core 21.

In the first embodiment, the refractive index distribution of the inner region is α power distribution, however, the present invention is not limited thereto. For example, the inner region 15 can present a constant refractive index distribution with the refractive index higher than that of the outer region 16. In this case, the material of the inner region 15 can be silica glass uniformly doped with germanium, for example. In addition, in the first embodiment, the refractive index of the inner region 15 can be the same as the refractive index of the outer region 16 similarly to the second embodiment. The refractive indexes can be the same by doping aluminum or phosphorus in the outer region 16 and adjusting an amount of germanium doped in the inner region 15, for example.

In the first and second embodiments, a plurality of cores 11 and 21 are arranged in one horizontal line. However, the present invention is not limited thereto and cores can be differently arranged. For example, in the cross-section of a multi-core fiber, a plurality of cores can be arranged in a matrix of three rows and three columns while the periphery surfaces of adjacent multi-core fibers contact with each other. Alternatively, one core can be arranged at the center of the clad and six cores can be arranged to surround the one core while contacting with the one core. Further, the multi-core fibers each having five cores are described in the first and second embodiments as examples, however, each of the multi-core fibers may have two to four, five or more cores.

Each of the clads 12 and 22 may have a two-layered structure. In this case, it is preferable that an inner region of the clad be made of silica glass doped with fluorine and an outer region of the clad be made of pure silica glass or silica glass slightly doped with chlorine, for example. The reason is that a multi-core fiber as a whole can have a high strength by using pure silica glass or silica glass slightly doped with chlorine, which has a high strength, for an outer region of a clad since the breaking strength of the multi-core fiber depends on the strength of the outer surface of the clad. In this case, the tubular clad glass bodies 12T and 22T in the first and second embodiments may be made of pure silica glass or silica glass slightly doped with chlorine.

In the embodiments described above, the respective cores 11 are made to have the same diameters and refractive indexes as each other and the respective cores 21 have the same diameters and refractive indexes as each other, however, in the present invention, the respective cores 11 or 21 may have diameters and refractive indexes different to each other. However, it is preferable that the respective cores 11 have the same diameters and refractive indexes as each other and the respective cores 21 have the same diameters and refractive indexes as each other from the viewpoint of coupling the respective cores 11 or 21 strongly. Even when the respective cores 11 or 21 have diameters and refractive indexes different to each other, it is preferable that the respective cores be made to have the same optical wave guiding properties as each other from the viewpoint of coupling the respective cores 11 or 21 strongly.

EXAMPLES

Hereinafter, the invention will be more concretely described with examples and comparative examples, but the invention is not limited thereto.

First Example

A multi-core fiber was produced similarly to the second producing method of the second embodiment. Five core glass bodies having the diameter of 6 mm and made of silica glass slightly doped with chlorine were prepared. Silica glass doped with fluorine was used as a material of a plurality of clad glass bodies surrounding the core glass bodies so as to have the relative refractive index difference from outer regions of −0.4%. The core glass bodies and the clad glass bodies described above were arranged as shown in FIG. 8 and a drawing process was performed to produce a multi-core fiber in which the diameter of a clad was about 180 μm and the diameter of each of cores was about 8 μm.

In the produced multi-core fiber, no bubbles were particularly found between the cores and the clad.

Second Example

A multi-core fiber was produced similarly to the second producing method of the first embodiment. Four core glass bodies having the diameter of 5 mm were prepared. Each of the core glass bodies was made to have: an inner region having the diameter of 4.85 mm; and an outer region having the thickness of 0.15 mm so that the ratio of the thickness of the outer region to the diameter of the core glass body was about 0.03. The outer regions were made of silica glass slightly doped with chlorine, and the inner regions were made of silica glass doped with germanium with concentration distribution so that the refractive index was α power distribution where α was about 3. The relative refractive index difference of the centers of the inner regions (centers of the cores) from the outer regions was set to 1.1%. Silica glass doped with fluorine was used as a material of the plurality of clad glass bodies surrounding the core glass bodies so as to have the relative refractive index difference from the outer regions of −0.4%. The tubular clad glass bodies were made of pure silica glass.

The core glass bodies and the clad glass bodies described above were arranged as shown in FIG. 4 and a drawing process was performed to produce a multi-core fiber in which the diameter of the region of the clad where fluorine is doped was about 80 μm, the outermost diameter of the clad was 125 μm, and the diameter of each of the cores was about 5 μm.

In the produced multi-core fiber, no bubbles were particularly found between the cores and the clad.

Third Example

A multi-core fiber was produced almost similarly to the second example. However, the following points were different from the second example. Each of core glass bodies was made to have the diameter of 2.8 mm, in which the diameter of an inner region was 2.6 mm and the thickness of an outer region was 0.2 mm so that the ratio of the thickness of the outer region to the diameter of a core was about 0.07. The core glass bodies were made to have the refractive index of α power distribution where α was about 2.5. The relative refractive index difference of the centers of the inner regions (centers of the cores) from the outer regions was set to 2.6%. The plurality of clad glass bodies surrounding the cores were made to have the relative refractive index difference from the outer regions of −0.7%. The tubular clad glass bodies were made of pure silica glass.

Then, a drawing process was performed similarly to the second example to produce a multi-core fiber in which the diameter of the region of the clad where fluorine is doped was about 80 μm, the outermost diameter of the clad was 125 μm, and the diameter of each of the cores was about 4 μm.

In the produced multi-core fiber, no bubbles were particularly found between the cores and the clad.

Comparative Example

A multi-core fiber was produced similarly to the first example except for that core glass bodies were made of silica glass including 10 mol % germanium, and a clad glass body was made of silica glass slightly doped with chlorine.

In the produced multi-core fiber, a plurality of bubbles were found between cores and a clad thereof. Although it was attempted to cut out apart without bubbles in the longitudinal direction of the produced fiber by eliminating parts having bubbles, no multi-core fiber of 50 m or more continuously having no bubbles could be obtained. It is assumed that these bubbles were generated because germanium near the surface of the core glass bodies volatilized.

From the result described above, it was confirmed that when at least outer regions of core glass bodies to be cores are made of silica glass undoped with germanium, bubbles are not generated between the cores and a clad of a produced multi-core fiber. The reason is assumed that generation of gas due to germanium volatilization was prevented when the core glass bodies are heated.

Industrial Applicability

As described above, according to the present invention, a method of producing a preform for a coupled multi-core fiber and a method of producing a coupled multi-core fiber capable of producing a reliable coupled multi-core fiber in which generation of bubbles between cores and a clad is prevented can be provided, and such a coupled multi-core fiber can be provided.

The invention claimed is:

1. A method of producing a coupled multi-core fiber which is provided with a plurality of cores and in which periphery surfaces of adjacent cores among the cores contact with each other, the method comprising:

preparing a plurality of core glass bodies to be the plurality of cores and a clad glass body, wherein the respective core glass bodies have outer regions having a predetermined thickness from the periphery surfaces and made of silica glass undoped with germanium, the respective outer regions extending along entire circumference of the respective core glass bodies, and the clad glass body is made of silica glass having a refractive index lower than a refractive index of the outer regions of the core glass bodies;

arranging the plurality of core glass bodies and the clad glass body in such a way that the plurality of core glass bodies are surrounded by the clad glass body, the periphery surfaces of adjacent core glass bodies among the core glass bodies contact with each other; and drawing the core glass bodies and the clad glass body while collapsing a gap between the core glass bodies and the clad glass body and while preventing generation of bubbles, due to volatilized gas of germanium, between the core glass bodies and the clad glass body.

2. The method according to claim 1, wherein the outer regions of the core glass bodies are made of pure silica glass or silica glass doped with chlorine.

3. The method according to claim 1 or 2, wherein the respective core glass bodies have inner regions surrounded by the outer regions and made of silica glass doped with germanium.

4. The method according to claim 1, wherein the respective core glass bodies are made of only silica glass undoped with germanium.

5. The method according to claim 4, wherein the respective core glass bodies are made of only pure silica glass or only silica glass doped with chlorine.

* * * * *